US 6,701,302 B1

(12) United States Patent
Schaeffer et al.

(10) Patent No.: US 6,701,302 B1
(45) Date of Patent: Mar. 2, 2004

(54) METHOD FOR MANAGING A QUICK DISTRIBUTION OF IMAGES

(75) Inventors: Pierre Schaeffer, Bramham Gardens (GB); Nicolas P. Touchard, Suresnes (FR); Olivier Seignol, Champs sur Marne (FR); Jean-Marie Vau, Paris (FR); Dale F. McIntyre, Honeoye, NY (US)

(73) Assignee: Eastman Kodak Company, Rochester, NY (US)

( * ) Notice: Subject to any disclaimer, the term of this patent is extended or adjusted under 35 U.S.C. 154(b) by 224 days.

(21) Appl. No.: 09/628,845

(22) Filed: Jul. 31, 2000

(30) Foreign Application Priority Data

Feb. 24, 2000 (FR) .............................. 00 02461

(51) Int. Cl.⁷ .............................................. G06F 17/60
(52) U.S. Cl. .............................. 705/26; 705/1; 396/639
(58) Field of Search .............................. 705/26, 27, 1; 701/200, 201; 396/639

(56) References Cited

U.S. PATENT DOCUMENTS 6,017,157 A * 1/2000 Garfinkle et al. ............ 396/639
6,026,375 A * 2/2000 Hall et al. ..................... 705/26

FOREIGN PATENT DOCUMENTS

| EP | 838767 | 4/1998 |
| EP | 844781 | 5/1998 |
| EP | 860980 | 8/1998 |

OTHER PUBLICATIONS

"Ofoto Announces Free Film Developing Making Online Photography Accessible to Everyone" (Jan. 31, 2000. Ofoto—Press Release).*
"Getting the 411 in a Flash" (Cisneros, Oscar. Jul. 6, 1999. Wired News).*
"Club Photo Brings Color Photo Albums to New Palm IIIc Connected Organizers; Album to go Extends New Color Capabilities for Business and Consumer Users" (Feb. 22, 2000. Business Wire).*
"Digital Intelligence Wants you to Edit Photos Without a PC" (Klein, Alec. Dec. 9, 1999. Wall St. Journal).*
"Eye Catching" (Sweeney, Terry et al. Feb. 21, 2000. Tele.com).*
"Motorola's Personal Networking Group Licesnses the LightSurf Wireless Digital Photography Architecture" (Feb. 7, 2000. Lightsurf—Press Release).*
"Manage the Message" (O'Shea, Dan. May 11, 1998. Telephony).*
"Photohighway.com to Launch Online Photo Community in Japan Japanese Site will Enable Photo Viewing on Mobile Phones" (Apr. 6, 2000. PR NewsWire).*
"Photohighway.com to Launch Online Photo Community in Japan Japanese Site will Enable Photo Viewing on Mobile Phones" Apr. 6, 2000. Press Release—Photohighway.*
"Getting the 411 in a Flash" Cisneros, Oscar. Jul. 6, 1999. Wired News.*

* cited by examiner

Primary Examiner—Jeffrey A. Smith
Assistant Examiner—S Chang
(74) Attorney, Agent, or Firm—Frank Pincelli

(57) ABSTRACT

The present invention concerns a method for managing a quick distribution of images. The method comprises the following steps: receiving, from a user, at least one image associated with a messaging system address; digitizing said at least one image when the image is not in digital form; storing said at least one image on a server; and sending a message to the messaging system address associated with said at least one image giving the information that said at least one image is available on the server.

17 Claims, 3 Drawing Sheets

METHOD FOR MANAGING A QUICK DISTRIBUTION OF IMAGES

FIELD OF THE INVENTION

The present invention concerns a method for managing a quick distribution of images.

BACKGROUND OF THE INVENTION

When a user wishes to have his photographs developed, whether from films in 24/36 format, APS format or transparencies, when he wishes to have a reprint made of a photograph already on paper or when he wishes to have an enlargement made or any other processing performed, he sends the image medium to a processing laboratory, ordering the processing he has chosen. Once the ordered processing has been carried out, the user does not receive his order immediately; this is because he must take into account the delay for dispatching to the retailer where he left his order. Moreover, if the user cannot go to the retailer, the delay in obtaining his photographs will be even longer. However, the user sometimes wishes to have an idea very quickly of the images he is going to obtain. Sometimes he also wishes to be able to send the images to his friends very quickly.

Similarly, when the user produces his photographs with a digital camera, he sometimes wishes to perform different operations, such as, for example, ordering printing at a chosen retailer, in a kiosk, or sending, to different people, one or more of his images on different types of medium or in different modified forms.

SUMMARY OF THE INVENTION

One object of the present invention is a method allowing the user, wherever he is situated, to manage quickly the distribution of images so as to give the user a very quick idea of the images he is going to obtain.

Another object of the present invention is a method allowing the user to choose very quickly and to send very quickly, to different locations, images he has chosen.

Another object of the invention is a method allowing the user very quickly to order printing of images in a chosen place.

The invention concerns a method for managing a quick distribution of images, the method comprising the steps of:
receiving, from a user, at least one image associated with a messaging system address;
digitizing said at least one image when the image is not in digital form;
storing said at least one image on a server; and
sending a message to the messaging system address associated with said at least one image giving the information that said at least one image is available on the server.

BRIEF DESCRIPTION OF THE DRAWINGS

Other characteristics will emerge from a reading of the following description, given with reference to the drawings in which.

DETAILED DESCRIPTION OF THE INVENTION

Figure 1:
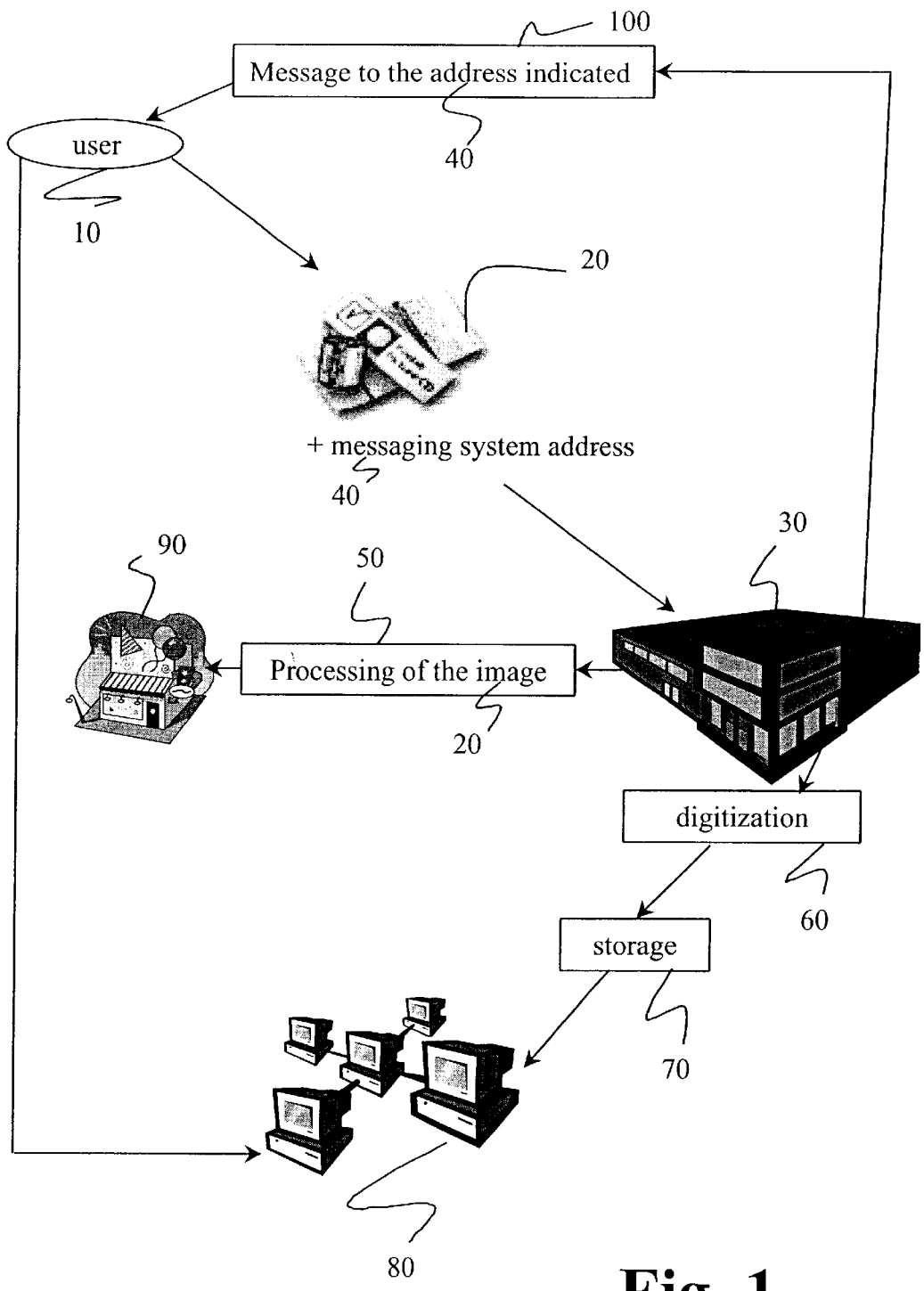
FIG. 1 depicts the steps of the method according to the invention.

If reference is made to FIG. 1, there can be seen the different steps of the method of the present invention when the image sent by the user is an image of the silver type.

"Silver images" means images which are not in electronic form, that is to say, for example, images on a 24/36 format negative, an APS format negative, a transparency, etc., or a paper print issuing from one of the preceding forms.

When a user 10 wishes to have one or more images 20 of this type processed, that is to say when he orders prints of negatives, reprints or enlargements, he sends a medium to be processed to a processing laboratory 30, for example. The laboratory 30 then receives a medium on which there is recorded at least one image 20 to be processed. The medium received by the laboratory 30 is associated with references identifying the user. According to the present invention, one of the references is a messaging system address 40 indicated by the user. The messaging system address 40 is for example an Internet type address or a fixed or cellular telephone number.

Figure 2:
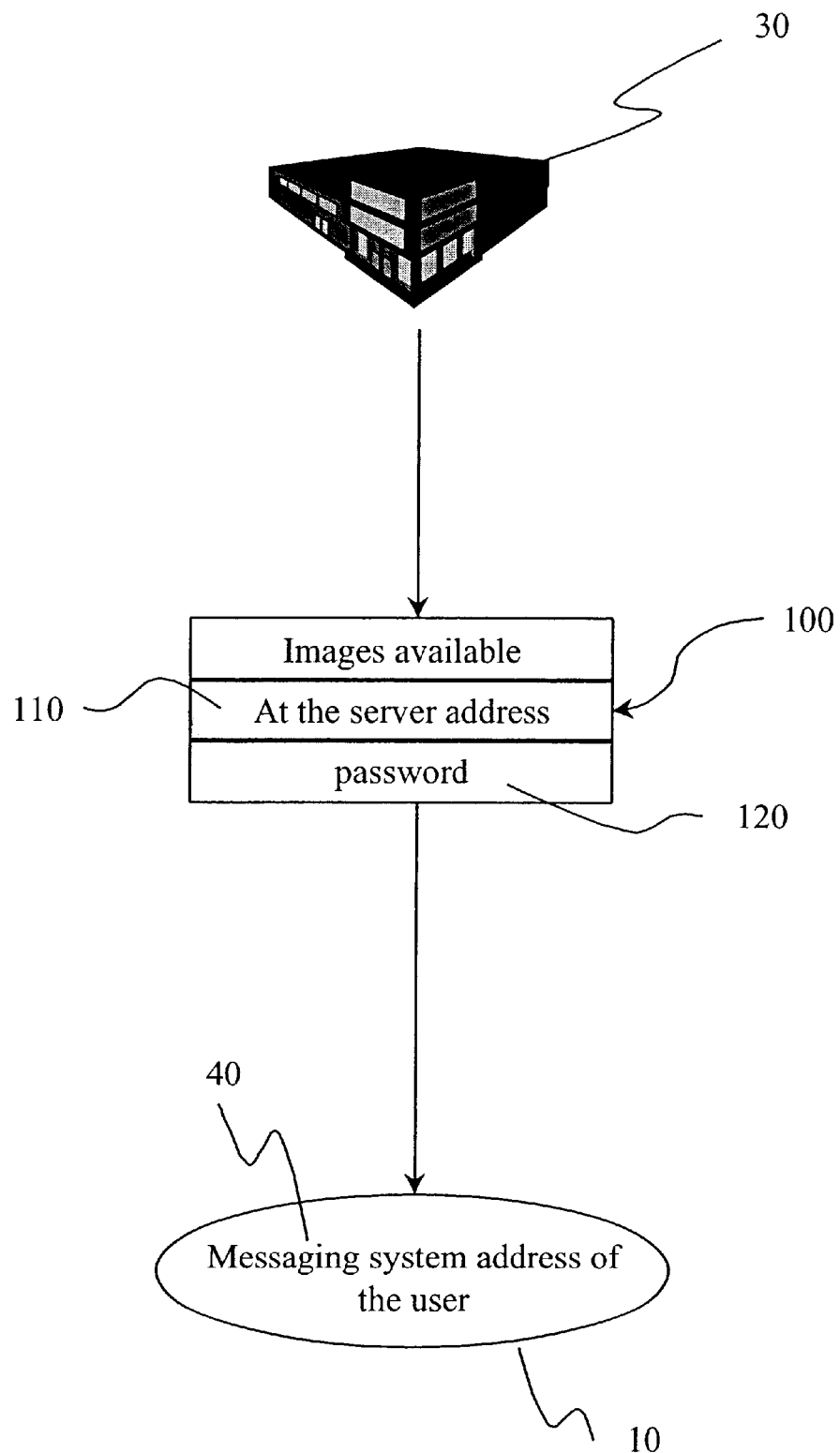
FIG. 2 depicts an illustration of the message sent to the user.

After having processed 50 the silver images 20, the laboratory 30 digitizes 60 the silver images 20 and stores them 70 on a data server 80. The data server is connected by a high-speed link to a storage server, not depicted, allowing connection to an Internet type network. Preferably, the storage server is connected to a WAP type gateway intended to provide communication between the network used for mobile telephony, for example GSM, and a cellular telephone. As soon as the images are stored, the laboratory 30 sends a message 100 to the messaging system address 40 associated with the medium, that is to say with the stored images 20, the message 100 giving the information that the images have been processed and that they are available on the server 80 (see FIG. 2). Advantageously, the message 100 also indicates the storage address 110 of the images on the server. Thus, the user receiving the message 100 can view his images straight away by reading the file stored on the server. It is evident that, at the same time, the processed images are sent to the retailer 90 by means of whom the user sent his medium to the laboratory.

According to a particular embodiment of the invention, the user sends digital images to a retailer or to an access provider of a telephone service, an Internet type service or some other service. The user connects his digital camera, via a computer or via a cellular telephone, to an Internet type network. The user can also upload from the flash card of the camera to the server of a kiosk or retailer.

When the messaging system address is an Internet type address, the user will receive a message by electronic mail, for example via an HTML screen, on a communication means having an Internet connection, for example a fixed or portable computer, a cellular telephone, etc. When the messaging system address is a conventional telephone number, the user will receive, for example, a voice message giving the information that the image has been processed.

Advantageously, when the messaging system address is a cellular telephone number, the message is sent by the SMS (Short Message Service) technique via the mobile telephone network. The message can also comprise, besides text, an image such as for example a logo.

Advantageously, the message 100 sent to the user comprises an image access password 120 used to protect access to the images on the server. Thus, the images stored by the laboratory on the server will not be accessible by everyone.

Advantageously, viewing of the images on the server by the user is free, that is to say it can be carried out directly by the user with no financial consideration. The only cost to the user will be the connection time to the Internet type network or the telephone communication time.

Advantageously, the message sent to the user offers different types of instruction which the user can order and which will be described later.

Once the user receives such a message 100, he can view his images straight away. Where the communication means on which he received the message 100 comprises a screen and an Internet type connection, notably in the case of a cellular telephone, he can use the same means to view his images. He can thus view them almost instantaneously, wherever he is. In the other cases, it is necessary to use another means having a screen and an Internet type connection.

The digitized images stored on the server are, for example, thumbnails, that is to say low-resolution images, for example 128×192 pixels in size, like those used for producing the print index supplied with photograph prints. Provision can also be made to store higher resolution images, for example 512×768 pixel images. Preferably, the images are stored for a limited period. Provision can be made, for example, to delete the images after a few days.

Figure 3:
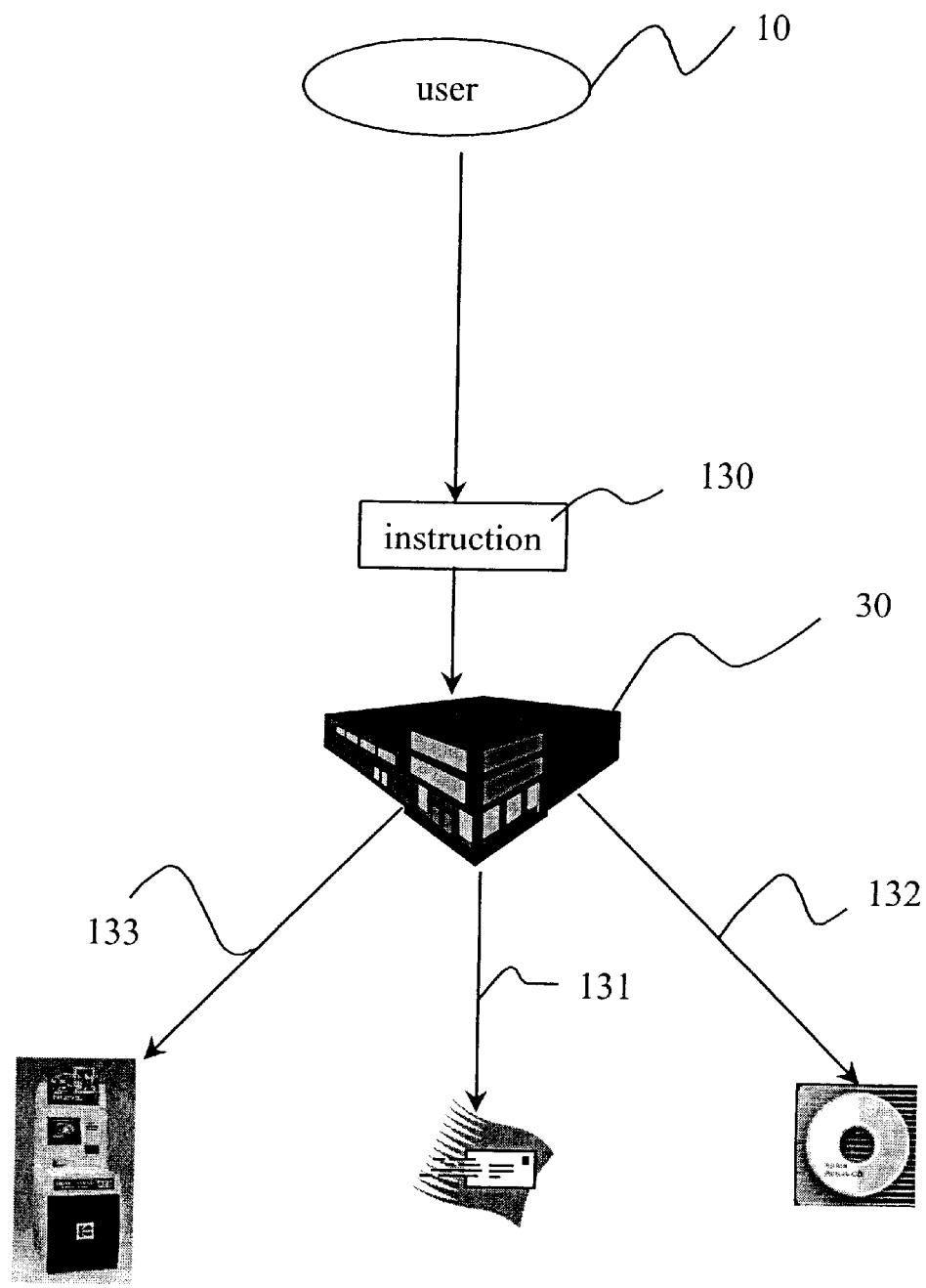
FIG. 3 depicts an example image distribution order.

After having viewed his images, the user can send one or more instructions electronically to the laboratory via an Internet type network. The laboratory can thus receive, at 130, different types of instruction from a user as depicted in FIG. 3.

The laboratory receives for example the instruction to transmit 131 one or more images to one or more Internet type addresses or to a number of a cellular telephone equipped with a screen allowing image viewing. The image received on a cellular telephone can of course be transferred to another viewing means, for example to a larger screen than that of the telephone. In fact, if the user wishes to send several images very quickly to different people, the laboratory can manage such dispatches. Advantageously, the images sent are then the stored images having a higher resolution than the thumbnails. Thus, the people who will receive these images will have them available very quickly and very easily. The method of the invention thus makes it possible to send very quickly, to a distant person, an image chosen by the user who has taken a photograph, the image being able to be viewed on different types of screen and notably, for example, directly on an electronic picture frame such as for example a screen marketed by CEIVA™. According to an alternative of this embodiment, the laboratory can receive the instruction to electronically send modified images such as for example images in the form of a jigsaw puzzle, images in cartoon form, images inserted in a greetings card or any other type of modified image. It can also receive the instruction to electronically send an image with which there is associated a sound message such as, for example, music in the form of an MP3 type file or a voice message recorded by the user, via his telephone for example; an automatic link will then be provided between the file containing the image and that containing the music. Inserting a voice message recorded by the user or a written message in the file containing the image can also be envisaged.

The laboratory can also receive 130 the instruction from a user to send 132 one or more identical or different images on a chosen medium to a postal address. The user can in effect choose, for example, to have a paper print, whether a simple print or an enlargement, of one of his images sent to a chosen person. He can also give the instruction to send a diskette, a CD or a DVD with one or more images or any other physical image recording medium.

The laboratory is also capable of receiving 130 the instruction from a user to print 133, in a given place chosen by the user, one or more of his images. The user has the ability to order, from the laboratory, printing in a kiosk or at a retailer, for example in the kiosk closest to where the user is situated. Advantageously, where the user is using a cellular telephone, provision can be made that the user has the choice of ordering paper printing at the retailer closest to the place where he is situated. The user can himself choose the place where he wishes to print his image but this place can also be determined automatically by locating the user. This is because the user can be located by virtue of his cellular telephone by means of location techniques specific to the mobile telecommunication systems, for example by means of the GSM system. He can also be located by a GPS when the telephone is equipped with a GPS. The laboratory can order the printing at the closest retailer while sending to the user, via an electronic message, the address of the closest retailer. The laboratory can also send a message to the user with a map of the place where he is situated making it possible to locate the different retailers.

All the instructions which have just been described can be not sent to the laboratory and carried out by the latter, but sent to a telephone services or Internet service access provider or to any other service provider.

The method of the present invention also comprises the step of carrying out one or more instructions received from the user in return for a payment from the user giving the instruction. Provision is made for example that the instruction which the user is capable of giving is accompanied by a payment card number so that, upon carrying out the instruction, the service provider debits the account corresponding to the card number. According to another embodiment applicable when the user uses a telephone to make his orders, the service provider carries out each instruction in return for a payment, the amount of which is displayed on the telephone bill and made secure by the SIM card of the cellular telephone. Provision can also be made that the various services provided to the user will be provided with no financial consideration, the only cost to the user being either the cost of the communication time of the connection to the Internet type network, or of the telephone communication time, or the cost as a function of the number of data packets.

The different users who have been described in the present application can be different people or one and the same person. This is because the user who sends his medium to the laboratory can indicate a messaging system address belonging to a different person. Furthermore, after having received a message, the user can give all the information necessary for another person to send the instructions to the laboratory or to the telephone service or Internet access provider.

It is evident that all types of messaging system can be used but the invention is particularly advantageous when the messaging system address is a cellular telephone number. This is because, since the user who receives the message always has his telephone with him, he very quickly receives the information indicating to him that his images are available on a server. Furthermore, since the majority of cellular telephones have an Internet type access and a screen, he can use his telephone directly for viewing the images on the one hand, and on the other hand for sending order instructions.

Furthermore, the use of the mobile telephone network allows the distribution of the images to be managed wherever the user is situated with no constraint for the user.

The invention has been described in detail with particular reference to certain preferred embodiments thereof, but it will be understood that variations and modifications can be effected within the spirit and scope of the invention.

What is claimed is:

1. Method of managing a quick distribution of images, the method comprising the steps of:

receiving, from a user, at least one image associated with a messaging system address of a cellular telephone;

digitizing said at least one image when it is not digital;

storing said at least one image on a server;

sending a message by the SMS technique to the messaging system address associated with said at least one image giving the information that said at least one image is available on the server;

accessing on said cellular telephone the said at least one image on the server by utilizing said information obtained by said SMS technique receiving, from the user on said cellular telephone, an order instruction for a print of said at least one image;

locating the user by means of location techniques specific to the cellular telecommunications system;

determining a retailer closest to where the user is located;

ordering said print of said at least one image at said retailer, and;

sending to the user's messaging system address the physical address of the retailer.

2. Method according to claim 1, in which the message sent indicates the storage address of said at least one image.

3. Method according to claim 1, in which the message sent indicates a password which enables access to said at least one image on the server.

4. Method according to claim 3, in which said at least one image stored on the server is an image of relatively high resolution.

5. Method according to claim 4, comprising the sending of an image of relatively high resolution in response of a user's order of sending at least one digitized image.

6. Method according to claim 1, in which the messaging system address is an Internet type address.

7. Method according to claim 1, in which the messaging system address is a telephone number.

8. Method according to claim 1, wherein the password enables access to only a thumbnail.

9. Method according to claim 8, in which said at least one image stored on the server is an image of relatively high resolution.

10. Method according to claim 9, comprising the sending of an image of relatively high resolution in response of a user's order of sending at least one digitized image.

11. Method according to claim 1, in which said at least one image stored on the server is an image of relatively high resolution.

12. Method according to claim 1, wherein the password enables access to only a thumbnail.

13. Method according to claim 1, which also comprises the step of:

receiving an instruction from a user to send one or more identical or different images he has chosen on a given medium to a postal address.

14. Method according to claim 1, which also comprises the step of:

receiving an instruction from a user to print in a given place at least one image.

15. Method according to claim 1, which also comprises the step of carrying out the received instruction in return for a payment from the user who gave the instruction.

16. The method of claim 1, wherein the user is located by means of location techniques specific to mobile telecommunication systems.

17. The method of claim 1, wherein the user is located by means of a GPS.

* * * * *